United States Patent Office 2,717,161
Patented Sept. 6, 1955

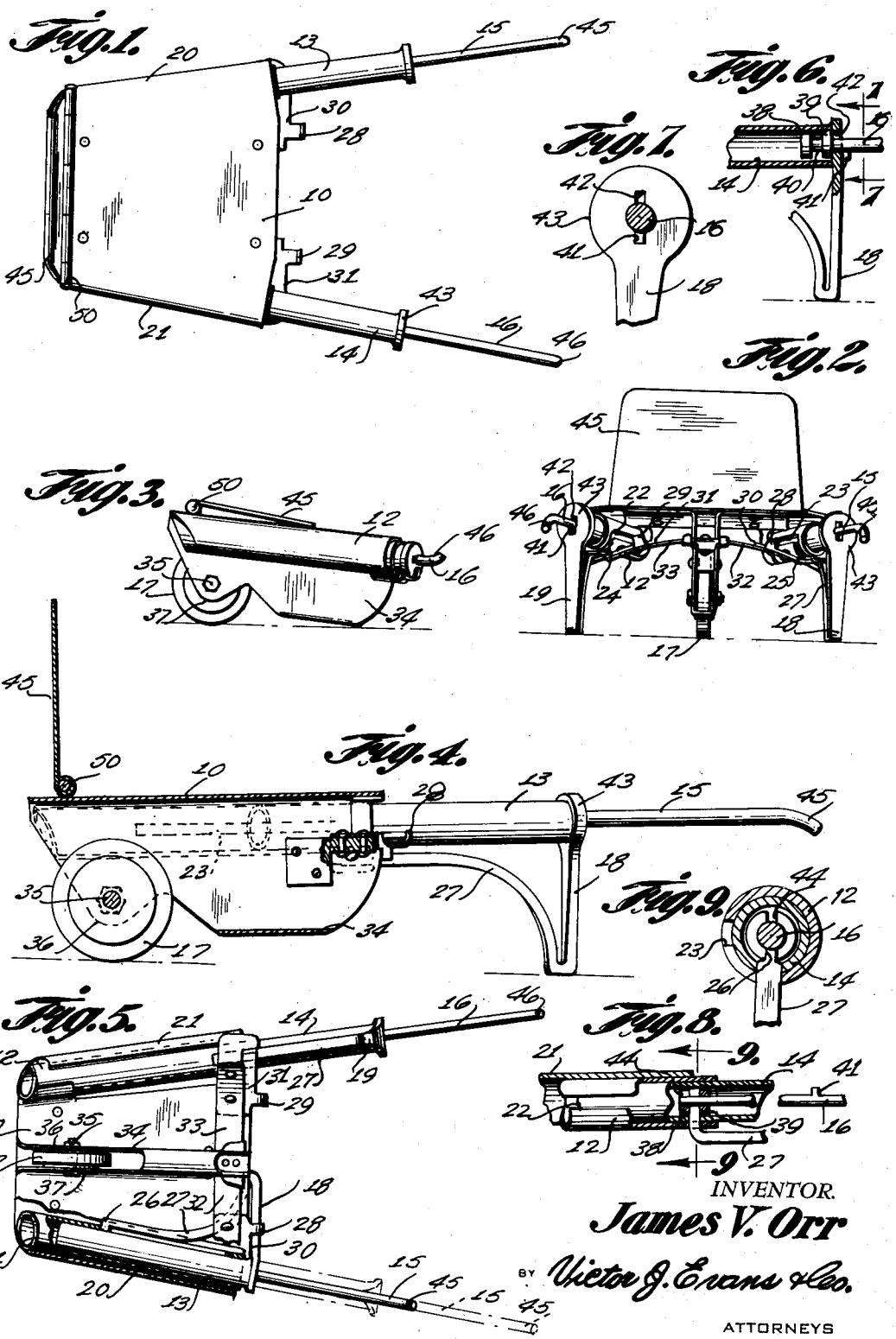

2,717,161

COLLAPSIBLE WHEELBARROW OR HAND TRUCK

James V. Orr, Pullman, Wash.

Application April 28, 1954, Serial No. 426,248

3 Claims. (Cl. 280—36)

This invention relates to a wheelbarrow or truck having telescoping handles whereby the handles with legs carried thereby are adapted to slide into the body of the wheelbarrow to conserve storage space when the device is not in use.

The purpose of the invention is to facilitate packing a quantity of wheelbarrows in storage or in a device, such as the body of a truck to economize space.

Various types of folding articles have been provided to facilitate storing and shipping articles of this type, however, it has been found difficult to fold or collapse a conventional wheelbarrow or truck. With this thought in mind this invention contemplates a wheelbarrow having telescoping handles with legs carried by the handles whereby the handles and legs are adapted to nest within the limits of the body of the wheelbarrow or truck.

The object of this invention is, therefore, to provide means for incorporating telescoping handles in the body of a wheelbarrow or the like whereby the handles with legs carried thereby may readily be extended for use.

Another object of the invention is to provide a wheelbarrow having telescoping handles in which the wheelbarrow may be provided with a conventional body.

A further object of the invention is to provide a wheelbarrow or hand truck having telescoping handles in which the device is of a simple and economical construction.

With these and other objects and advantages in view the invention embodies a carrier having a flat platform with an end panel hinged to the forward edge and with the forward edge supported by wheel or wheels and in which the handles are formed with telescoping tubes having suitable latch elements and supporting legs whereby the handles may be, selectively, extended for use or collapsed for storage and shipping.

Other features and advantages of the invention will appear from the following description taken in connection with the drawing, wherein:

Figure 1 is a plan view of the collapsible wheelbarrow showing the wheelbarrow with the handles extended for use.

Figure 2 is an end elevational view of the wheelbarrow looking toward the end from which the handles extend.

Figure 3 is a side elevational view of the wheelbarrow showing the wheelbarrow with the handles collapsed or nested in the body.

Figure 4 is a longitudinal section through the wheelbarrow with the parts shown on an enlarged scale showing one of the handles extended.

Figure 5 is a view looking upwardly toward the under surface of the wheelbarrow with one of the handles broken away and shown in section and with the handles shown partly extended in full lines and fully extended in broken lines.

Figure 6 is a detail showing a section through the outer end of an intermediate tube of a handle with the handle bar extended therefrom and with other parts broken away.

Figure 7 is a cross section taken on line 7—7 of Fig. 6 showing a key and slot for retaining the extended end of a handle in the extended position.

Figure 8 is a detail showing a longitudinal section through the connection between one of the handles and the edge of the body of the wheelbarrow showing the latch extended from one of the legs for retaining the parts in collapsed and extended positions.

Figure 9 is a cross section taken on line 9—9 of Fig. 8 also showing the latch assembly.

Referring now to the drawing wherein like reference characters denote corresponding parts the improved collapsible wheelbarrow or truck of this invention includes a platform 10 having stationary tubes 11 and 12 with telescoping tubes 13 and 14 slidably mounted in the tubes 11 and 12, respectively, and with rods 15 and 16 slidably mounted in the telescoping tubes 13 and 14, and, as shown in Figs. 4 and 5 the device is provided with a wheel 17 and legs 18 and 19, the legs being integral with the telescoping tubes 13 and 14.

The stationary tubes 11 and 12 are secured in rolled edges 20 and 21 at the sides of the platform 10, and, as shown in Figs. 2, 4, and 5 the stationary tubes 11 and 12 are provided with longitudinally disposed slots 22 and 23, respectively. The slots are provided with transversely disposed sections 24 and 25 at the outer ends into which projections 26 on the ends of arcuate arms 27 of the legs 18 and 19 are positioned and, as shown in Fig. 2 the projections are located in the lower ends of the end sections 24 and 25 with the legs extended downwardly, whereas, in folding the legs the projections follow the portions 24 and 25 of the slots upwardly to the longitudinally disposed sections 22 and 23 whereby the projections follow the slots, passing to the opposite ends thereof as the telescoping tubes 13 and 14 move into the stationary tubes 11 and 12, as shown in Fig. 5. In this folding operation vertically disposed sections of the legs are positioned over clips 28 and 29 extended from plates 30 and 31 at the ends of braces 32 and 33 which extend from a centrally disposed strut 34 to the the outer ends of the stationary tubes 11 and 12.

The centrally disposed strut 34, which is U-shaped in cross section, provides mounting means for the wheel 17, the wheel being rotatably mounted with a bolt 35 in extensions 36 and 37 of side webs of the strut 34.

The handles 15 and 16 are provided with spaced collars 38 and 39 on their inner ends, which are slidably mounted in the tubes 13 and 14 and with the collars providing an annular recess 40 into which the projections 26 are adapted to extend to lock the rods forming the handles 15 and 16 in inwardly extended positions, as shown in Fig. 8.

The handles 15 and 16 are also provided with keys 41 that are positioned to pass through slots 42 in flanges 43 in the outer ends of the tubes 13 and 14 with the rods turned so that the keys extend upwardly, and with the keys extended downwardly, as shown in Fig. 6 the handles are locked with the collars 39 on one of the sides of the flanges 43 and with the keys 41 on the opposite or outer sides of the flanges.

The collars 38 are provided with notches 44 which, with the handles 15 and 16 turned through an angle of 180 degrees, from the position shown in Fig. 8, permit the handles to slide outwardly over the projections 26 when it is desired to extend the handles. The extended ends of the handles 15 and 16 are provided with arcuate gripping sections 45 and 46.

The forward end of the platform is provided with a front board or plate 45 which is secured to the platform with a hinge 50 and, as illustrated in Figs. 1 and 3 the plate may extend upwardly or may be folded to a nested position upon the platform.

It will be understood that although the device is shown as having one wheel, it may also have two wheels and the device may be used as a wheelbarrow or truck, as may be desired.

It will be understood that modifications, within the scope of the appended claims, may be made in the design and arrangement of the parts without departing from the spirit of the invention.

What is claimed is:

1. In a collapsible wheelbarrow, the combination which comprises a platform the sides of which are diverged from the forward end to the rear end, a wheel positioned below the platform and rotatably mounted on the forward end thereof, stationary tubes having longitudinally disposed slots with transversely positioned end sections in inner surfaces thereof mounted on the sides of the platform, telescoping tubes slidably mounted in the stationary tubes, rods providing handles slidably mounted in the telescoping tubes, legs carried by the telescoping tubes and having arms with projections on extended ends thereof positioned with the projections in the slots of the stationary tubes, and keys positioned to coact with collars on the rods forming the handles for locking the handles in extended positions.

2. In a collapsible wheelbarrow as in claim 1, wherein means is provided for retaining the legs in folded position.

3. In a collapsible wheelbarrow as in claim 1, wherein a U-shaped strut is provided on the lower surface of said platform for mounting said wheel and braces are connected to said strut and extend outwardly thereof to the sides of said platform and means are connected to said braces for engagement with said legs for retaining said legs in folded position.

References Cited in the file of this patent

UNITED STATES PATENTS

| 2,468,390 | Binz | Apr. 26, 1949 |

FOREIGN PATENTS

| 201,935 | Germany | Oct. 1, 1908 |